(12) United States Patent
Baba et al.

(10) Patent No.: US 6,998,551 B2
(45) Date of Patent: Feb. 14, 2006

(54) SWITCH APPARATUS

(75) Inventors: Ryuji Baba, Tsuruga (JP); Hisashi Nishikawa, Shiga (JP); Takashi Ichimura, Tsuruga (JP)

(73) Assignee: Matsushita Electric Industrial Co., Ltd., (JP)

( * ) Notice: Subject to any disclaimer, the term of this patent is extended or adjusted under 35 U.S.C. 154(b) by 0 days.

(21) Appl. No.: 11/068,822

(22) Filed: Mar. 2, 2005

(65) Prior Publication Data
US 2005/0205399 A1    Sep. 22, 2005

(30) Foreign Application Priority Data
Mar. 17, 2004   (JP)   ............................. 2004-076221

(51) Int. Cl.
*H01H 9/00*   (2006.01)
(52) U.S. Cl. ............... 200/61.54; 200/61.57; 280/731; 439/15
(58) Field of Classification Search .. 200/61.54–61.57; 280/731, 728.3, 771–775; 439/15, 164, 564
See application file for complete search history.

(56) References Cited

U.S. PATENT DOCUMENTS

| | | | | |
|---|---|---|---|---|
| 4,821,016 A | * | 4/1989 | Zeller et al. | 307/10.1 |
| 4,990,727 A | * | 2/1991 | Ohno et al. | 200/61.54 |
| 5,747,763 A | * | 5/1998 | Uchiyama et al. | 200/61.54 |
| 5,855,392 A | * | 1/1999 | Simpson et al. | 280/731 |
| 6,053,742 A | * | 4/2000 | Matsumoto et al. | 439/15 |
| 6,183,005 B1 | * | 2/2001 | Nishijima et al. | 280/731 |
| 6,459,058 B1 | * | 10/2002 | Shinohe et al. | 200/341 |
| 6,624,365 B1 | * | 9/2003 | Miyako et al. | 200/61.54 |

FOREIGN PATENT DOCUMENTS

JP    6-45220    6/1994

\* cited by examiner

*Primary Examiner*—Kyung Lee
(74) *Attorney, Agent, or Firm*—Steptoe & Johnson LLP (57) ABSTRACT

A switch apparatus, including: a substantially box-like case; a cylinder section; a lever; a substantially cylindrical columnar support; an engagement convex section; an engagement concave section; and a press-in section. The cylinder section is provided at a substantial center of the case and has at an inner circumference thereof a reception section. The lever is attached to the case and is pivoted and operated to provide an electric connection of switch contacts provided in the case. The columnar support is inserted to the cylinder section and has one end that is abutted with the reception section. The engagement convex section is provided at one of the reception section and the columnar support and the engagement concave section is provided at the other. The press-in section is provided at one of the engagement convex section or the engagement concave section. The engagement convex section is pressed-in to and engaged with the engagement concave section via the press-in section. The structure as described above provides a switch apparatus that has a simple configuration, that reduces the backlash when the lever is operated, and that can be operated in a favorable manner.

6 Claims, 10 Drawing Sheets

SWITCH APPARATUS

BACKGROUND OF THE INVENTION

1. Field of the Invention

The present invention relates to a switch apparatus that is mainly provided at the lower part of a handle of an automobile to control, by the operation of a lever, the operation of a light, windshield wiper or the like.

2. Background Art

Recently, there have been more automobiles including a switch apparatus in which a lever switch provided at the lower part of a handle can be operated to control the operation of a turn signal, lighting of light, or the operation of a windshield wiper, for example.

Figure 9:
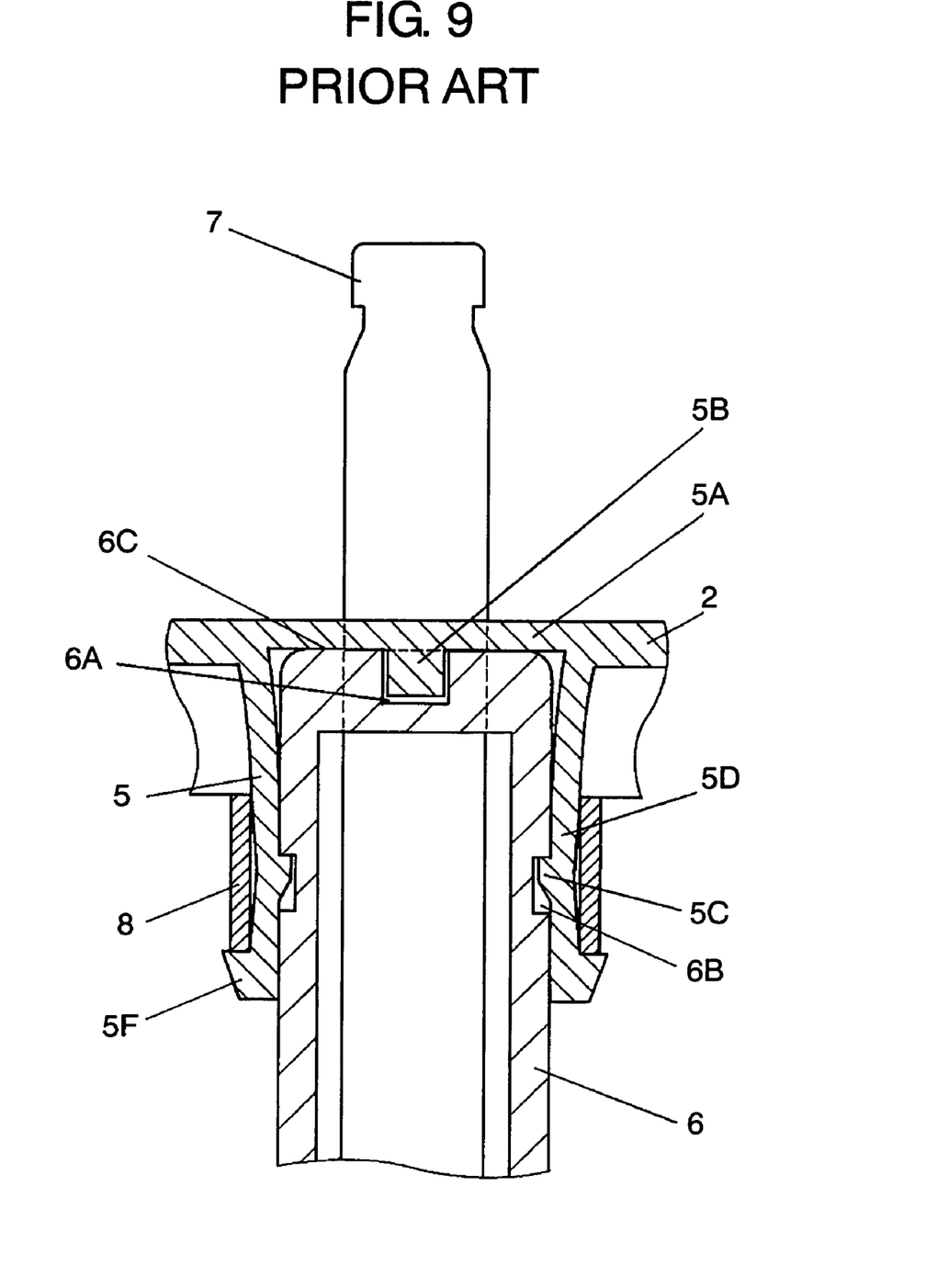
FIG. 9 is a cross-sectional view of a conventional switch apparatus.
Figure 10:
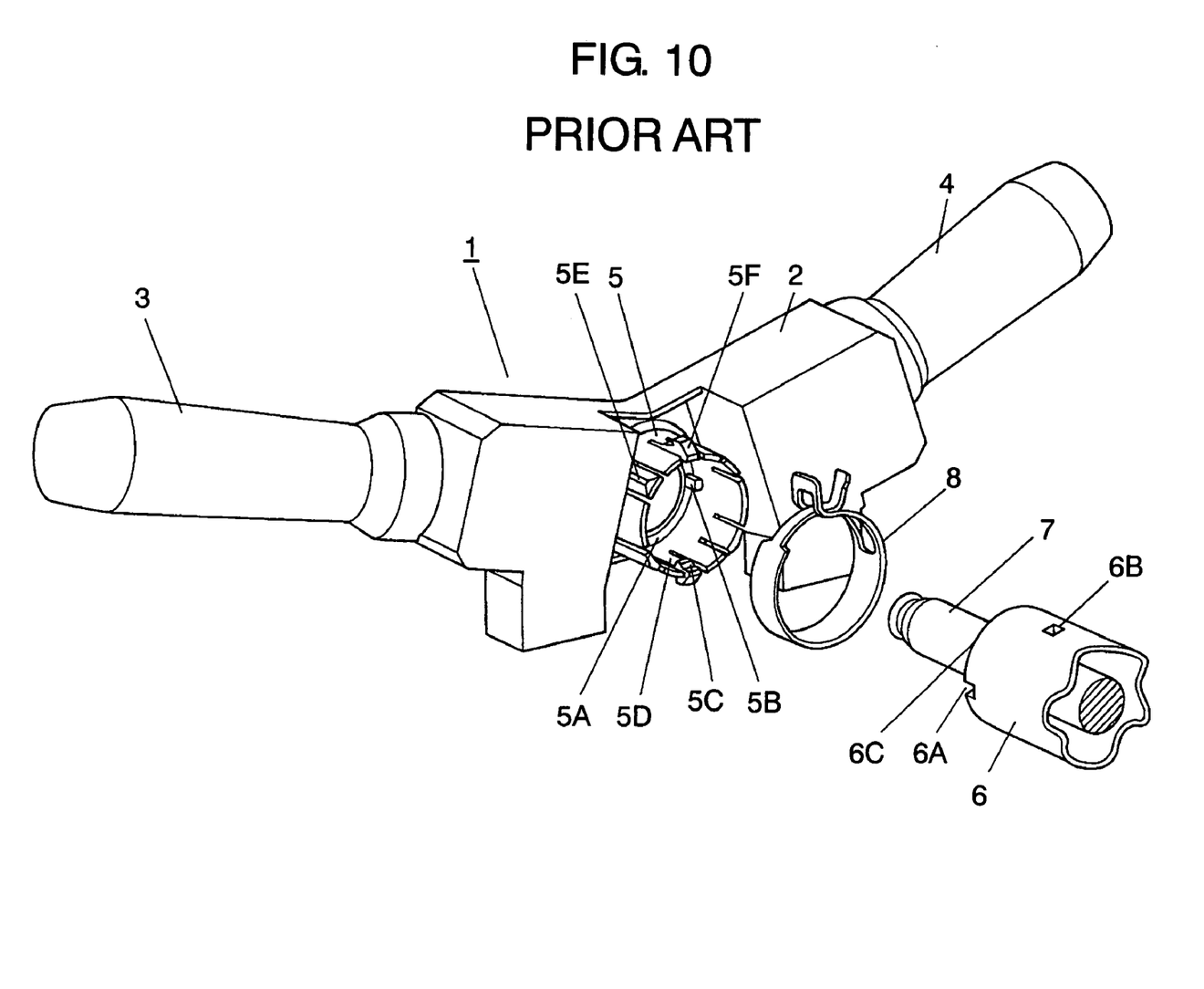
FIG. 10 is an exploded perspective view of the conventional switch apparatus.

FIG. 9 is a cross-sectional view of a conventional switch apparatus. FIG. 10 is an exploded perspective view of the conventional switch apparatus. In FIG. 9 and FIG. 10, lever switch 1 (hereinafter referred to as "switch 1") includes substantially box-like case 2, left lever 3, and right lever 4. Levers 3 and 4 are attached to both ends of case 2 so as to be able to be pivoted with click feeling. Levers 3 and 4 are pivoted to electrically connect and disconnect switch contacts (not shown) in case 2.

Case 2 has at the substantial center a communication hole to provide cylinder section 5 that extends in the lower direction and that has a substantially circular cylinder shape.

Cylinder section 5 has, along the inner circumference at the root thereof, reception section 5A that is projected inwardly and that has a flat face shape. Reception section 5A has, at the lower face thereof, substantially rectangular engagement convex section 5B (hereinafter referred to as "section 5B") that is projected in the lower direction.

Cylinder section 5 also has, at both sides thereof, slits to provide a plurality of lock pieces 5D and a plurality of elastic contact pieces 5E. Lock piece 5D has, at the inner side, lock section 5C that has an arm-like shape to be elastically deformed and that is convex. Lock piece 5D also has, at the outer side, retention section 5F that is convex. Elastic contact piece 5E has a projection section that has an arm-like shape to be elastically deformed and that has a hill-like shape at the entire outer face thereof in the longitudinal direction.

Metal columnar support 6 has a substantially circular cylinder shape and extends out of a vehicle body (not shown). Steering shaft 7 (hereinafter referred to as "shaft 7") protruding to the upper part of columnar support 6 is inserted to columnar support 6 so as to be rotatable. Furthermore, an upper end of columnar support 6 works as abutting section 6C. Abutting section 6C has, at the outer circumference thereof, engagement concave section 6A (hereinafter referred to as "section 6A") that has an inner width that is slightly larger than an outer width of section 5B. Section 6A is inserted to and engaged with section 5B to fix the rotation of case 2 to columnar support 6.

Abutting section 6C is abutted with section 5A. Furthermore, lock section 5C is engaged with concave locking section 6B at the outer circumference of columnar support 6. This allows case 2 to be locked to columnar support 6.

Ring 8 is made of highly elastic metal and has a strip-like shape. Ring 8 is provided between a lower face of case 2 at the outer circumference of cylinder section 5 and retention section 5F. Ring 8 presses lock piece 5D and elastic contact piece 5E from those outside. Switch 1 is attached to columnar support 6 while the rotation and up-and-down movement being regulated.

The switch apparatus thus structured has shaft 7 that is upwardly protruded. Shaft 7 is attached with a handle (not shown). A switch contact of switch 1 is connected, via a connector cable (not shown) or the like, to an electronic circuit (not shown) of the vehicle body.

When lever 3 is pivoted and operated in the structure as described above, switch contacts in case 2 are electrically connected and disconnected and an electric signal is transmitted via the connector cable to the electronic circuit of the vehicle body. Then, a turn signal representing right turning or left turning is lighted (not shown), for example.

Alternatively, when lever 4 is pivoted and operated, the rate at which the windshield wiper is operated is changed in accordance with the position at which lever 4 was operated (not shown).

The conventional switch apparatus as described above is disclosed, for example, in Japanese Laid-Open Utility Model Publication No. 6-45220, for example.

However, when an extremely high operation force or impact force is applied to levers 3 and 4 in the above conventional switch apparatus, a clearance between section 5B and section 6A causes little backlash in the rotation direction. This backlash is expanded at the tip ends of levers 3 and 4, causing a driver to feel uncomfortable rattle.

SUMMARY OF THE INVENTION

The switch apparatus of the present invention includes: a substantially box-like case; a cylinder section; a lever; a substantially cylindrical columnar support; an engagement convex section; an engagement concave section; and a press-in section. The cylinder section is provided at a substantial center of the case and has at an inner circumference thereof a reception section. The lever is attached to the case and is pivoted and operated to provide an electric connection of switch contacts provided in the case. The columnar support is inserted to the cylinder section and has one end that is abutted with the reception section. The engagement convex section is provided at one of the reception section and the columnar support and the engagement concave section is provided at the other. The press-in section is provided at one of the engagement convex section or the engagement concave section. The engagement convex section is pressed-in to and engaged with the engagement concave section via the press-in section. The structure as described above provides a switch apparatus that has a simple configuration, that reduces the backlash when the lever is operated, and that can be operated in a favorable manner.

DETAILED DESCRIPTION OF THE INVENTION

Figure 1:
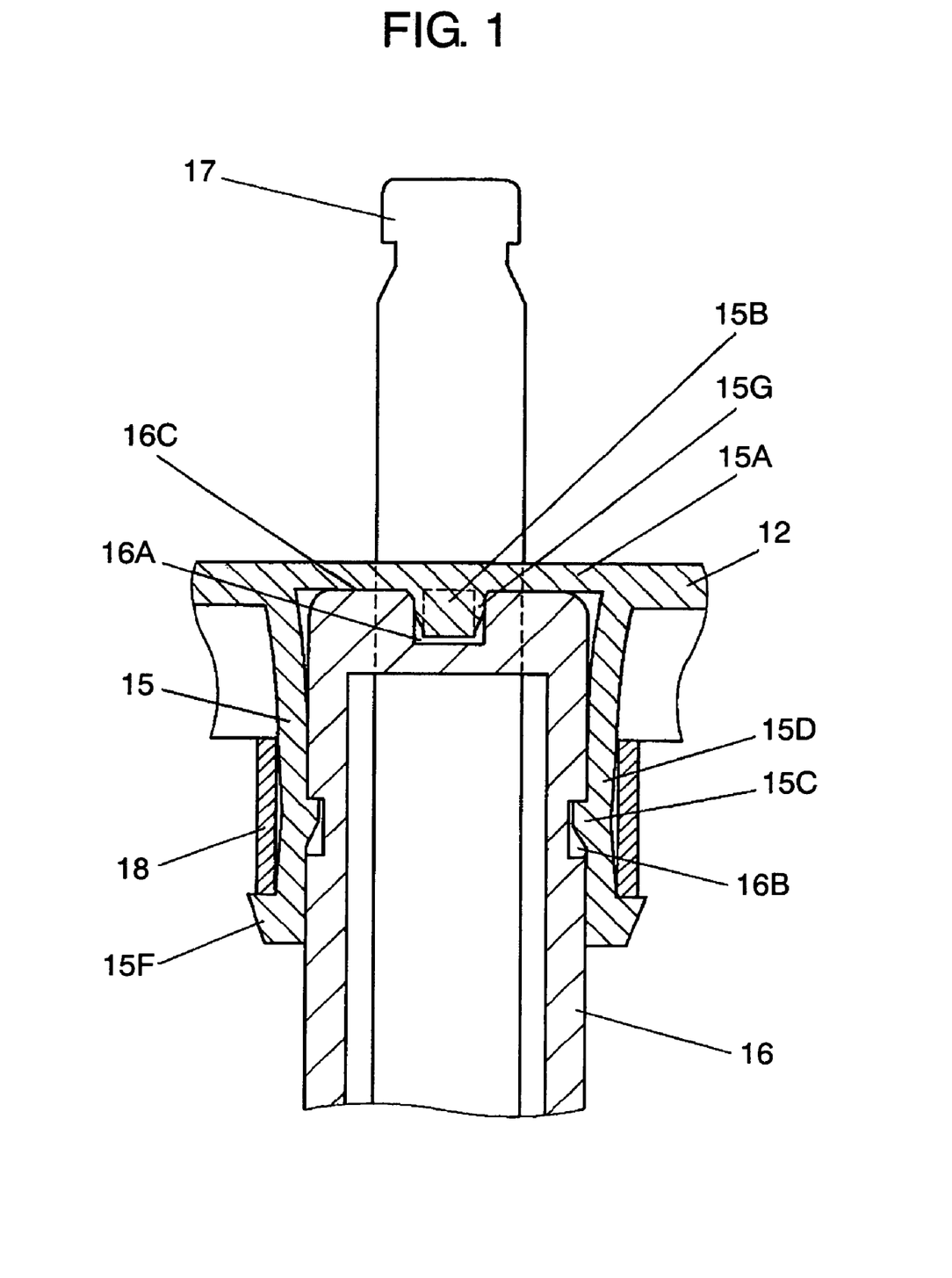
FIG. 1 is a cross-sectional view of a switch apparatus according to an embodiment of the present invention.
Figure 2:
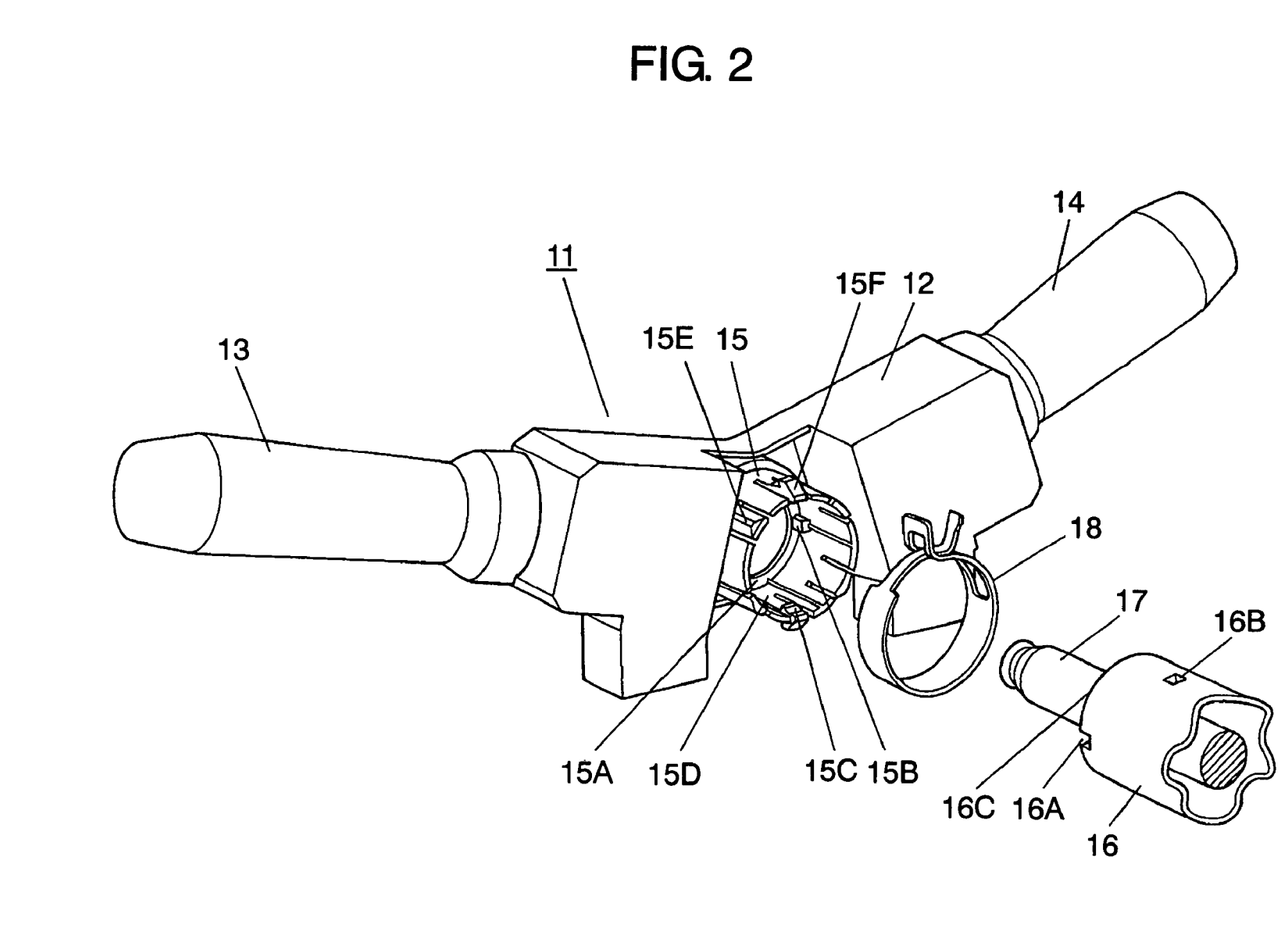
FIG. 2 is an exploded perspective view of the switch apparatus shown in FIG. 1.
Figure 3:
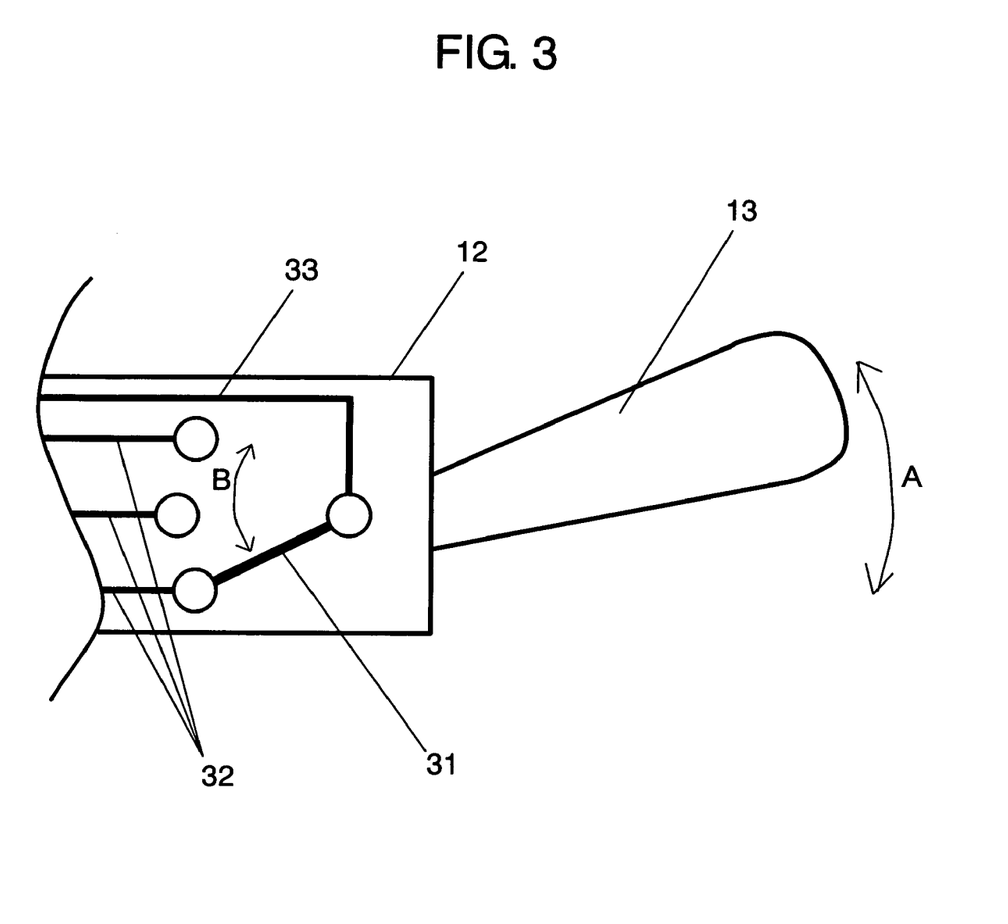
FIG. 3 is a concept diagram of a switch contact section of the switch apparatus shown in FIG. 1.

FIG. 1 is a cross-sectional view of a switch apparatus according to an embodiment of the present invention. FIG. 2 is an exploded perspective view of the switch apparatus shown in FIG. 1. FIG. 3 is a concept diagram of a switch contact section of the switch apparatus shown in FIG. 1.

In FIG. 1 to FIG. 3, lever switch 11 (hereinafter referred to as "switch 11") includes substantially box-like case 12 and left lever 13 and right lever 14 attached to both ends of case 12. Levers 13 and 14 are attached to both ends of case 12 so as to be able to be pivoted with click feeling. Levers 13 and 14 are pivoted and operated to electrically connect and disconnect switch contacts 31 in case 12.

Case 12 is made of insulating resin (e.g., polyamide (PA), polyoxymethylene (POM)). Case 12 has at the center a communication hole around which cylinder section 15 is provided that has a substantially circular cylinder-shape and that extends in the lower direction.

Cylinder section 15 has, along the inner circumference at the root thereof, reception section 15A that is projected inwardly and that has a substantially flat face-like shape. Reception section 15A has, at the lower face thereof, a substantially rectangular engagement convex section 15B (hereinafter referred to as "section 15B") that is projected in the lower direction.

Figure 4:
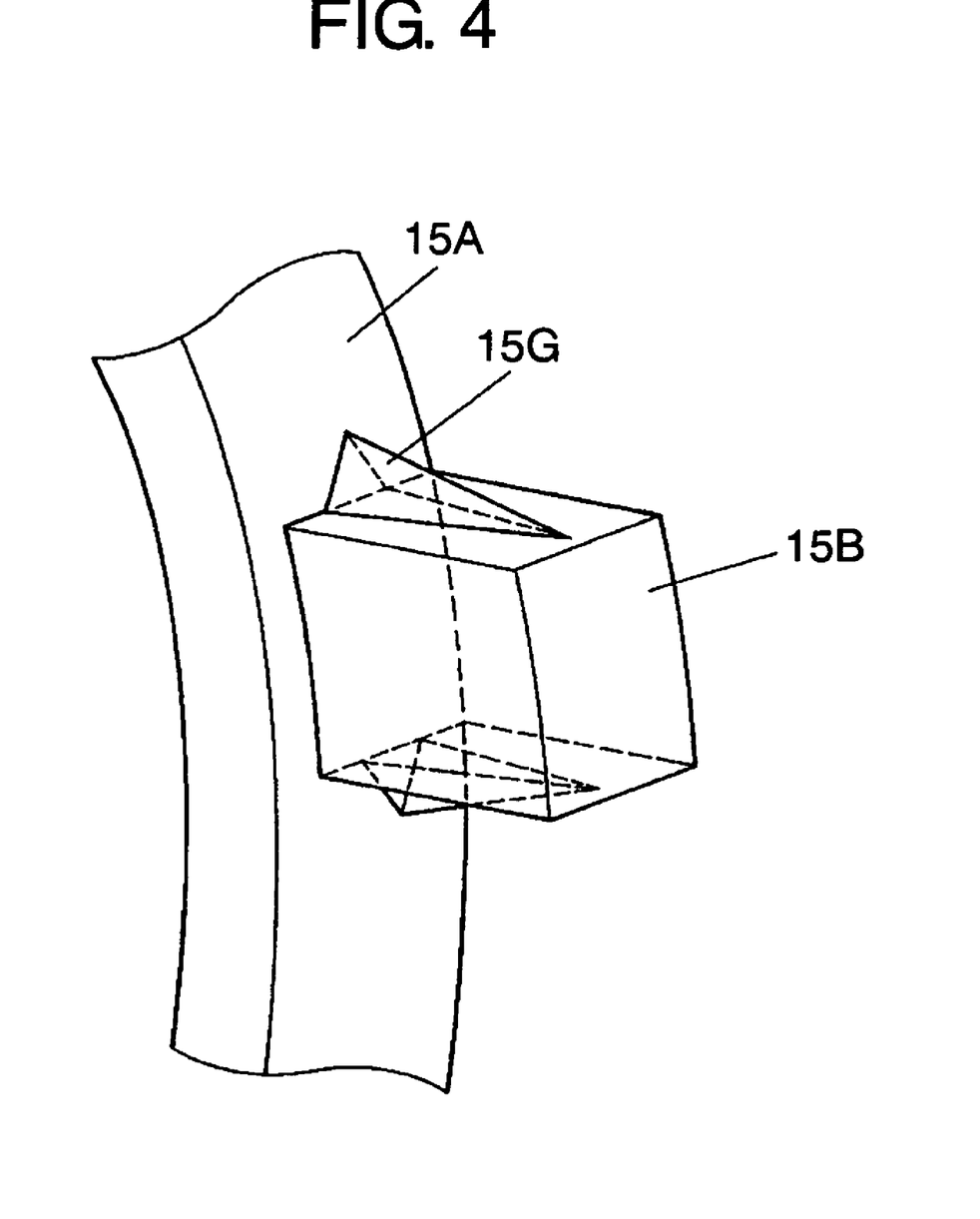
FIG. 4 is a perspective view of the main part of the switch apparatus shown in FIG. 1.

FIG. 4 is a perspective view of the main part showing the periphery of section 15B. As shown in FIG. 4, section 15B has, at both side faces in the width direction, press-in sections 15G that are inclined from the lower part to the upper part and that have a substantially triangular pyramid shape.

Cylinder section 15 has at both sides slits to provide a plurality of lock pieces 15D and a plurality of elastic contact pieces 15E. Lock piece 15D has, at the inner face, lock section 15C that has an arm-like shape to be elastically deformed and that is convex. Lock piece 15D also has, at the outer face, retention section 5F that is convex. Elastic contact piece 15E has a projection section that also has an arm-like shape to be elastically deformed and that has a hill-like shape at the entire outer face thereof in the longitudinal direction.

Columnar support 16 is made of metal (e.g., aluminum, iron, magnesium) and has a substantially circular cylinder shape. Columnar support 16 is projected from a vehicle body (not shown). Columnar support 16 is inserted with steering shaft 17 (hereinafter referred to as "shaft 17") that protrudes in the upward direction and that is provided to be rotatable.

Furthermore, columnar support 16 has at the upper end thereof abutting section 16C. Abutting section 16C has, at the outer circumference thereof, substantially rectangular engagement concave section 16A (hereinafter referred to as "section 16A") that has a notch corresponding to section 15B. Section 16A has chamfered upper corners at both ends thereof to provide chamfered sections 16D.

Figure 5A:
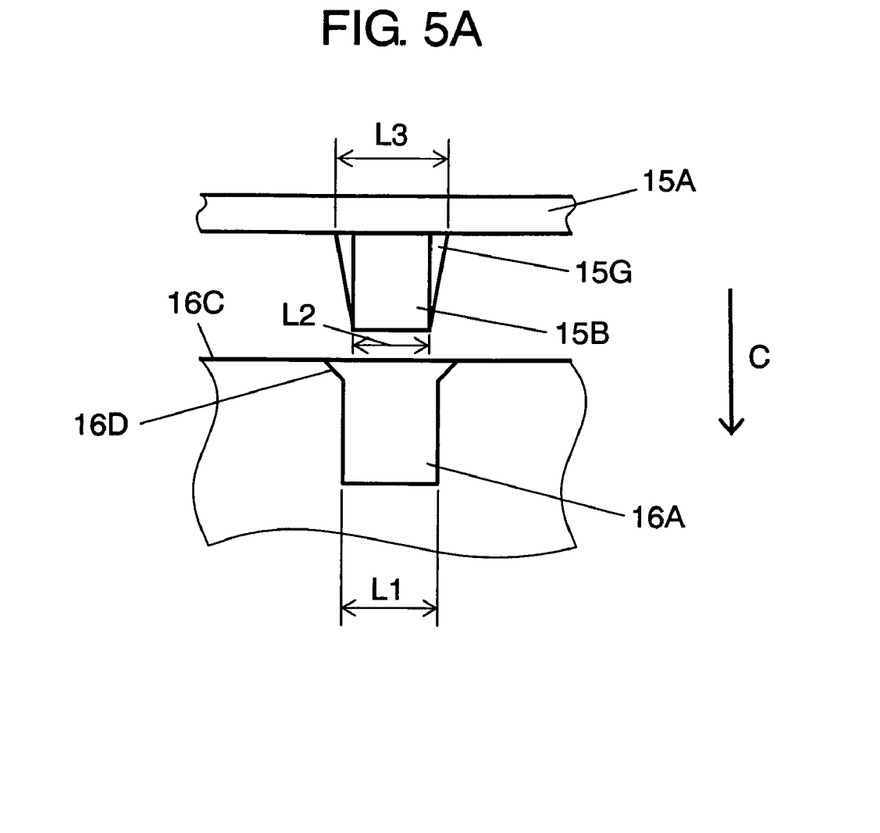
FIG. 5A is an enlarged plan view of the main part of the switch apparatus shown in FIG. 1.

FIG. 5A is a plan view of the main part showing when case 12 is not attached to columnar support 16 yet. As shown in FIG. 5A, inner width L1 of section 16A is larger than lower end width L2 of section 15B and is smaller than outer width L3 at the root of press-in section 15G. In other words, the relation of L3>L1>L2 is established.

Furthermore, abutting section 16C is abutted with reception section 15A, press-in section 15G and section 15B are pressed-in to and engaged with section 16A, and case 12 is fixed to columnar support 16 in the rotation direction. Then, lock section 15C is engaged with concave locking section 16B provided at the outer circumference of columnar support 16 to lock columnar support 16 to case 12.

Figure 5B:
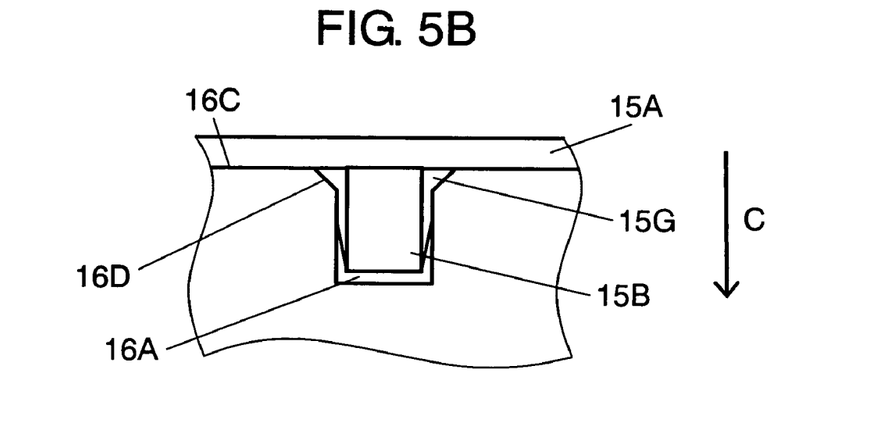
FIG. 5B is an enlarged plan view of the main part of the switch apparatus shown in FIG. 1.

Specifically, when section 15B is engaged with section 16A, the tip end of section 15B is guided to chamfered section 16D as shown in FIG. 5B and is inserted in lower engagement direction C (direction shown by arrow C in FIG. 5A). Then, an inner face of section 16A collapses and deforms press-in section 15G while being pressed-in to press-in section 15G. This eliminates the clearance between section 15B and section 16A in the rotation direction and allows section 15B to be pressed-in to and engaged with section 16A via press-in section 15G. Then, the lower face of reception section 15A is abutted with abutting section 16C.

Ring 18 has a substantially strip-like shape and is made of highly elastic metal (e.g., steel product for spring, stainless steel). Ring 18 is provided on the outer circumference of cylinder section 15 between the lower face of case 12 and retention section 15F. Ring 18 presses lock piece 15D and elastic contact piece 15E from those outside. This allows cylinder section 15 to be fixed to columnar support 16, thus providing a switch apparatus.

Shaft 17 upwardly protruded is fixed with a handle (not shown). Switch contacts 31 of switch 11 is connected, via connector cables 32 and 33 (hereinafter referred to as "cables 32 and 33"), to an electronic circuit (not shown) provided in the vehicle body. The switch apparatus is provided in front of a driver seat in the automobile.

When lever 13 in the structure as described above is pivoted and operated in the direction shown by arrow A as shown in FIG. 3, switch contacts 31 in case 12 are interlocked and driven in the direction shown by arrow B. This provides electrical connection or disconnection between cables 32 and cable 33, thus transmitting an electric signal to the electronic circuit in the vehicle body. Then, a turn signal representing right turning or left turning is winked (not shown), for example.

Alternatively, when lever 14 is pivoted and operated, an electrical connection or disconnection between cables 32 and cable 33 is similarly provided and the rate at which the windshield wiper is operated is changed in accordance with the position at which lever 14 was operated (not shown).

The eliminated clearance between section 15B and section 16A in the rotation direction as described above allows, even when an extreme operation force or impact force is applied to levers 13 and 14 when levers 13 and 14 are pivoted and operated, levers 13 and 14 to be suppressed from having backlash. As a result, an operator of levers 13 and 14 can pivot and operate levers 13 and 14 without feeling uncomfortable rattle.

In this way, the lower face of reception section 15A includes section 15B and columnar support 16 includes section 16A. Furthermore, both side faces of section 15B have press-in sections 15G. This allows, when section 15B is engaged with section 16A, press-in section 15G to be collapsed and deformed while allowing section 15B to be pressed-in to and engaged with section 16A. This eliminates the backlash between case 12 and columnar support 16 in the rotation direction. This reduces the backlash caused when levers 13 and 14 are operated, providing a switch apparatus having a favorable operation feeling.

Although the above description described a structure in which section 15B having at both side faces press-in sections 15G is provided at cylinder section 15 and section 15B is pressed-in to and engaged with section 16A. However, another contrasting structure also may be used in which reception section 15A has at the lower face an engagement concave section and abutting section 16C of columnar support 16 includes an engagement convex section. In this case, the engagement convex section is pressed-in to and engaged with the engagement concave section of the lower face of reception section 15A to provide the same action and effect. Although section 15B in the above description has at both sides thereof press-in sections 15G, another structure also may be used in which both inner faces of section 16A have press-in sections 15G to provide the same action and effect.

Although the above description described a case in which press-in section 15G has a substantially triangular pyramid shape, press-in section 15G has a triangular pyramid shape that has a gradually increasing cross-sectional area against engagement direction C. This allows, when section 15B is engaged with section 16A, a pressure for deforming press-in section 15G to be increased gradually, providing a smooth engagement.

Figure 6A:
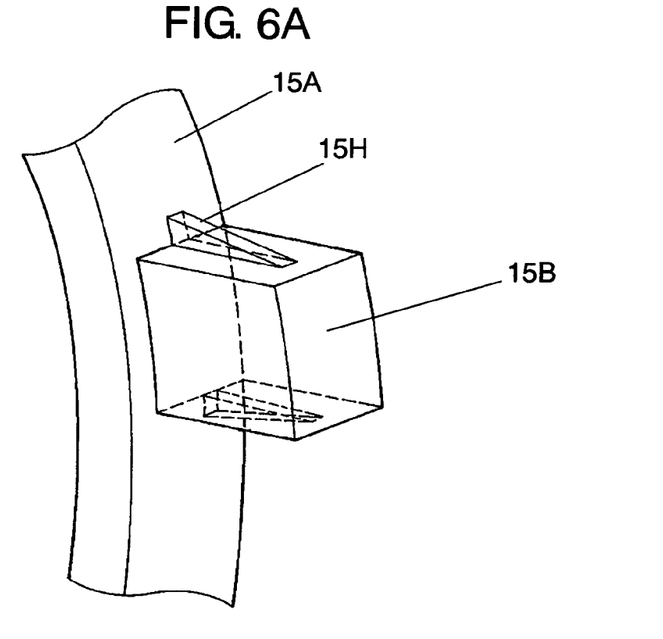
FIG. 6A is a perspective view of the main part of a switch apparatus according to another embodiment of the present invention.
Figure 6B:
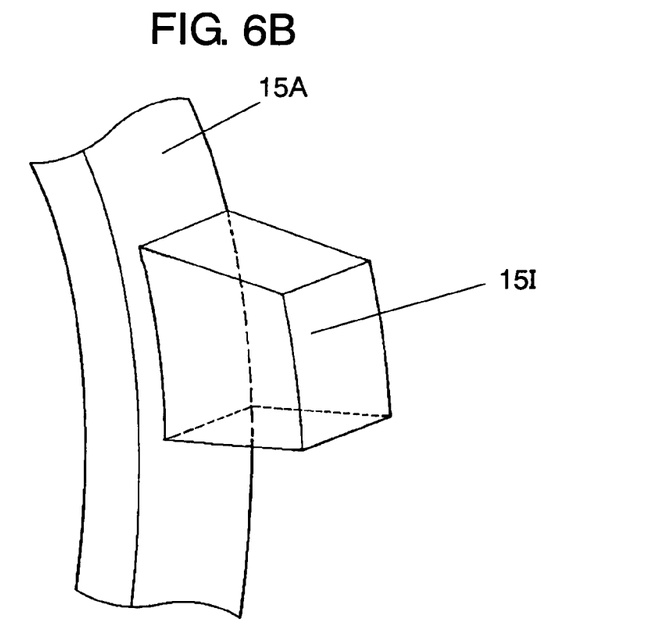
FIG. 6B is a perspective view of the main part of a switch apparatus according to another embodiment of the present invention.

The shape of press-in section 15G is not limited to a triangular pyramid shape. For example, a substantially columnar rib shape or wedge shape having a gradually increasing cross-sectional area against engagement direction C also may be used. For example, a rib shape as shown in press-in section 15H of FIG. 6A may be used. A wedge shape in engagement convex section 15I of FIG. 6B also may be used. Another shape also may be used in which the side face of section 15B includes a dome-shaped projection to be used as a press-in section, although the cross-sectional area is not gradually increased.

As described above, the shape of the press-in section may be appropriately selected in consideration of whether cylinder section 15 is smoothly inserted to columnar support 16 or not, whether cylinder section 15 is retained by columnar support 16 in the rotation direction or not, for example.

Figure 7:
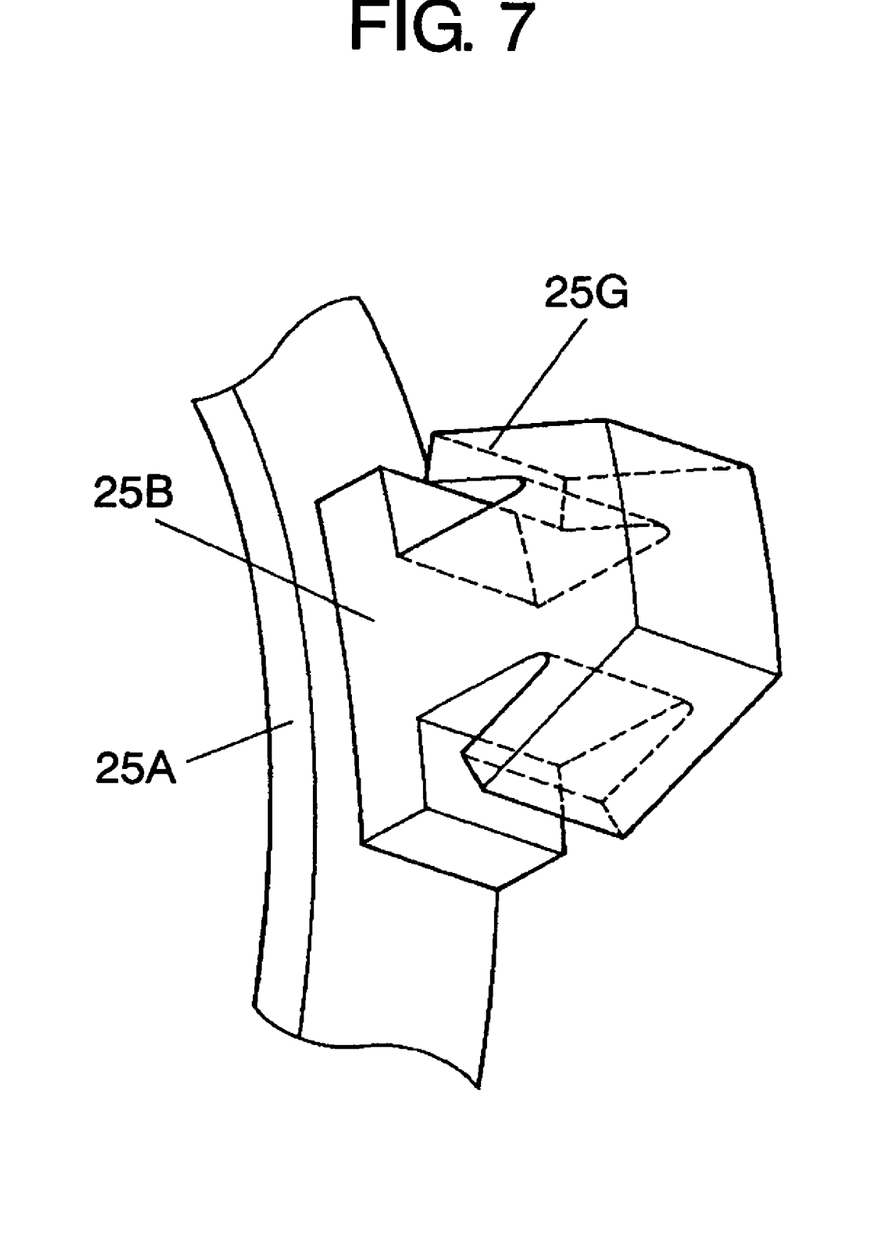
FIG. 7 is a perspective view of the main part of a switch apparatus according to another embodiment of the present invention.
Figure 8A:
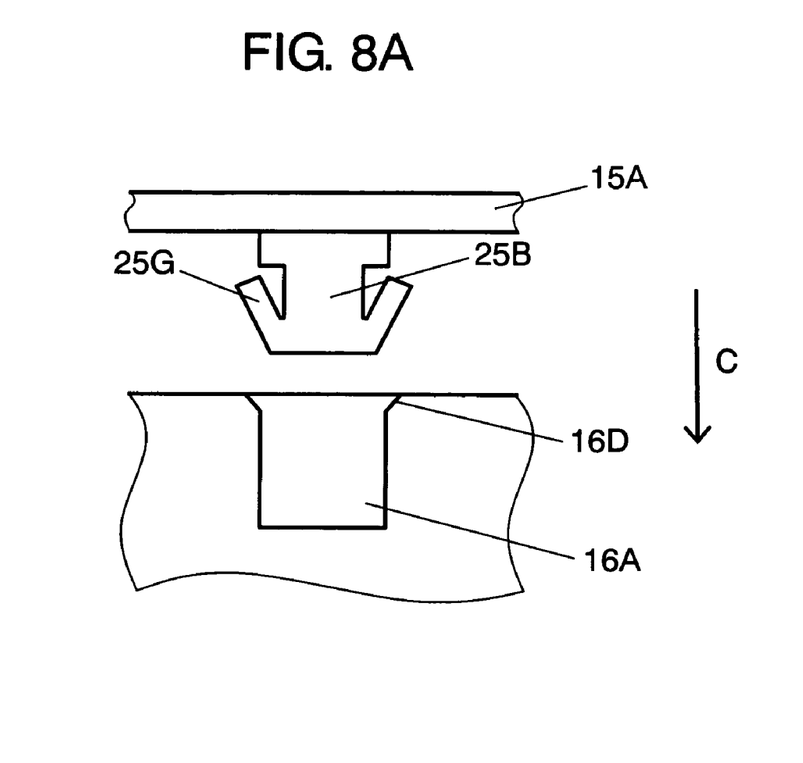
FIG. 8A is an enlarged plan view of the main part of the switch apparatus shown in FIG. 7.
Figure 8B:
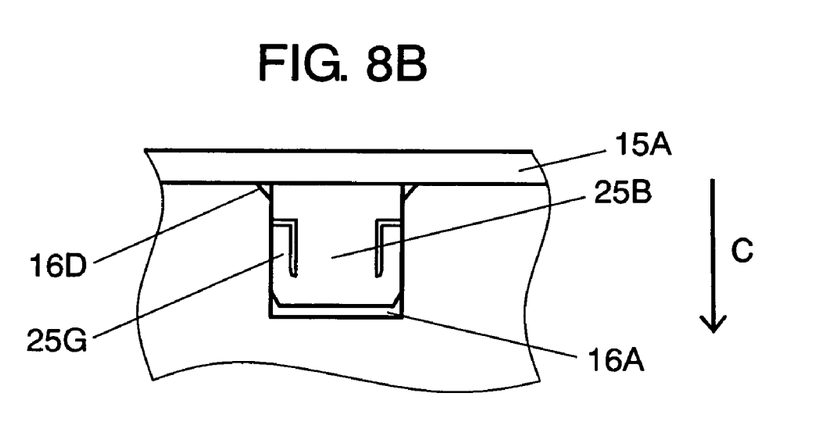
FIG. 8B is an enlarged plan view of the main part of the switch apparatus shown in FIG. 7.

FIG. 7 is a perspective view of the main part showing another embodiment of the engagement convex section. FIGS. 8A and 8B are a plan view of the main part showing how the engagement convex section is engaged with the engagement concave section, respectively.

As shown in FIG. 7, reception section 15A has, at the lower face, engagement convex section 25B (hereinafter referred to as "section 25B"). Section 25B is provided by extending elastic deformable press-in section 25G from the tip ends to the root of both side faces. Press-in section 25G has a V-like shape to section 25B. The root of the V-like shape has an elastic deformation to allow the tip end part to approach section 25B, reducing the size of the width.

The structure as described above allows section 25B to be inserted in engagement direction C as shown in FIG. 8B and allows press-in section 25G to have an elastic deformation while allowing section 25B to be pressed-in to and engaged with section 16A. Thus section 25B is repeatedly pressed-in to and engaged with section 16A in a steady manner. As a result, an increase in the backlash when levers 13 and 14 are operated is prevented even when switch 11 is attached to or detached from columnar support 16 repeatedly due to the inspection or repair of the switch apparatus. Thus, a switch apparatus always providing a comfortable operation feeling is provided.

What is claimed is:

1. A switch apparatus, comprising:
    a substantially box-like case:
    a cylinder section that is provided at a substantially center of the case and that has at an inner circumference thereof a reception section;
    a lever that is attached to the case and that is pivoted and operated to provide an electric connection of switch contacts provided in the case;
    a substantially cylindrical columnar support that is inserted to the cylinder section and that has one end abutted with the reception section;
    an engagement convex section provided at one of the reception section and the columnar support;
    an engagement concave section provided at the other of the reception section and the columnar support; and
    a press-in section provided at one of the engagement convex section and the engagement concave section,
    wherein the engagement convex section is pressed-in to and engaged with the engagement concave section via the press-in section.

2. The switch apparatus according to claim 1, wherein the press-in section is elastically deformable.

3. The switch apparatus according to claim 1, wherein the press-in section has a cross-sectional area that is gradually increased against an engagement direction in which the engagement convex section is engaged with the engagement concave section.

4. The switch apparatus according to claim 3, wherein the press-in section has a triangular pyramid shape.

5. The switch apparatus according to claim 3, wherein the press-in section has a columnar rib-like shape.

6. The switch apparatus according to claim 2, wherein the press-in section has a V-like shape.

* * * * *